No. 893,410.

PATENTED JULY 14, 1908.

T. H. WILSON.
JOURNAL BEARING.
APPLICATION FILED APR. 20, 1906.

WITNESSES
W. P. Burke
M. Petit

INVENTOR
Thomas Henry Wilson
By Richards
ATTYS

UNITED STATES PATENT OFFICE.

THOMAS HENRY WILSON, OF BRISBANE, QUEENSLAND, AUSTRALIA.

JOURNAL-BEARING.

No. 893,410.   Specification of Letters Patent.   Patented July 14, 1908.

Application filed April 20, 1906. Serial No. 312,882.

*To all whom it may concern:*

Be it known that I, THOMAS HENRY WILSON, a subject of the King of the United Kingdom of Great Britain and Ireland, and resident of Norman Park, Brisbane, in the State of Queensland, Commonwealth of Australia, have invented certain new and useful Improvements in Journal-Bearings, of which the following is a specification.

This invention relates to improvements in journal bearings its object being the production of a composite bearing which can be both manufactured and renewed at a much less cost than the present bearings without lessening the efficiency and is especially adapted for use in tramways and railways.

The improvements consist in constructing the bearing in three separate portions, the bearing metal proper which intimately engages with the axle or shaft being a separate casting formed to fit into a metal base of inferior or cheaper metal and the two held together by an intermediate metal of lower melting standard which is run in between the separate portions and locks them together by lugs provided for the purpose: also forming a buffer or cushion between the bearing metal proper and the metal base or frame.

To fully describe the invention I will now refer to the drawings in which:—

Figure 1:
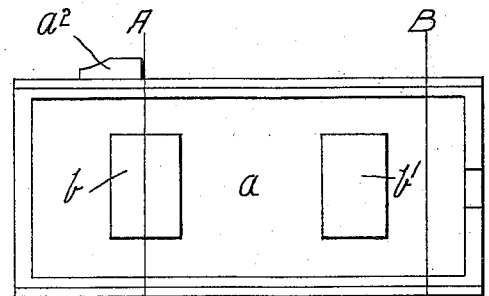
Figure 2:
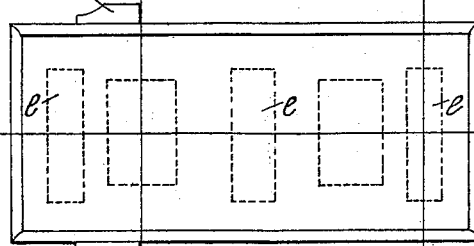
Figure 3:
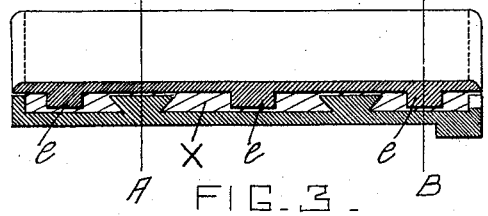
Figure 4:
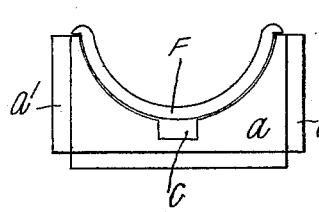
Figure 5:
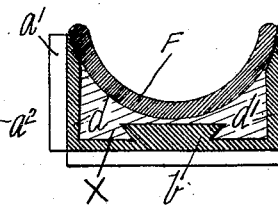
Figure 6:
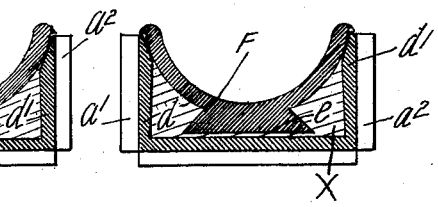

Figure 1 is a plan of the metal base. Fig. 2 is a plan view of the complete bearing showing the lugs on the under side in dotted lines. Fig. 3 longitudinal section of composite bearing through D D Fig. 2. Fig. 4 end elevation of composite bearing. Fig. 5 cross section of composite bearing through A A Figs. 1, 2 and 3. Fig. 6 cross section through lug of upper portion on line B B Figs. 1, 2 and 3.

The reference letters indicate like parts in all figures.

($a$) is a casing or base plate of inferior metal such as cast iron or steel having lugs ($a^1$) and ($a^2$) for fitting into the axle box: ($b$) and ($b^1$) are lugs with feather edges cast integrally with the casing.

($c$) is a hole in one end for running in the intermediate metal.

The walls ($d$) and ($d^1$) of the casing diverge on the inside slightly outwards towards the bottom forming with the intermediate metal a wedge lock binding the three portions firmly together and forming the composite bearing.

Cast integrally with the upper portion or bearing proper F (which consists of gun metal, phosphor bronze or such like metals) on the underside are lugs ($e$); when the upper portion is placed in the casing, the lugs ($e$) on the upper portion fit between the lugs ($b$) and ($b^1$) on the casing.

When the upper and lower portions are fitted together and the intermediate metal X of low melting value such as lead or other cheap metal, run in, they form a composite and solid bearing.

As the upper portion F wears away and requires renewing, it can be removed by melting and running out the intermediate metal (the melting point of which being much lower than either of the other portions) and substituting a new upper portion.

I have illustrated the bearing as applied to car journal boxes but I would have it understood that I do not confine myself to any particular shape as it is equally adapted for use in milling or other machinery and the shape may be varied to suit pedestals or other supports of different designs.

Having now described my invention, what I claim as new and desire to secure by Letters Patent is:

A journal bearing comprising an iron casing having its walls diverging in the inside slightly outwards towards the bottom, said casing having lugs projecting upwardly from its bottom, a liner of superior metal fitting in the casing said liner having lugs projecting downwards from its bottom and adapted to lie in the spaces between the lugs on the casing, said casing having an opening $c$ in its end and a filling of metal of a low melting point between the liner and casing.

In witness whereof, I have hereunto set my hand in presence of two witnesses.

THOMAS HENRY WILSON.

Witnesses:
  E. LATHEN ABELL,
  CLARA ABELL.